United States Patent [19]

Commeau

[11] 4,409,466
[45] Oct. 11, 1983

[54] METHOD OF MANUFACTURE OF A HOOP FOR THE VESSEL OF A NUCLEAR REACTOR

[75] Inventor: Alain Commeau, Montchanin, France

[73] Assignee: Framatome, Courbevoie, France

[21] Appl. No.: 307,260

[22] Filed: Sep. 30, 1981

[30] Foreign Application Priority Data

Oct. 22, 1980 [FR] France ................................ 80 22554

[51] Int. Cl.$^3$ ........................................ B23K 9/00
[52] U.S. Cl. ................................ 219/137 R; 219/149; 219/76.14; 228/184
[58] Field of Search ................ 219/76.1, 76.12, 76.14, 219/73.1, 72, 128, 137 WM, 137 R, 149, 150 R, 154, 118; 228/170, 172, 176, 184

[56] References Cited

U.S. PATENT DOCUMENTS 2,054,939 9/1936 Larson ............................ 219/137 R
2,177,868 10/1939 Chapman ........................ 219/76.14

FOREIGN PATENT DOCUMENTS 2134278 12/1972 France .

*Primary Examiner*—B. A. Reynolds
*Assistant Examiner*—Catherine Sigda
*Attorney, Agent, or Firm*—Pollock, Vande Sande & Priddy

[57] ABSTRACT

A method of manufacturing a hoop for a nuclear reactor vessel, equipped internally with projecting guide blocks serving for the guidance of the internal equipment. The method consists in coating an outer cylindrical hoop (1) of low-alloy steel internally with a thin plating (2) of stainless steel and in attaching supporting blocks (3) to the inside of this hoop, leaving bare an area of low-alloy steel of the hoop surrounded by the stainless steel plating (2), depositing on this hollowed area by arc welding a plating (34) of nickel-base alloy of Inconel type until a profile is obtained which projects with respect to the plating (2) of stainless steel, machining this plating (34) and then arc welding thereto a separate piece (35) of nickel-base alloy of Inconel type with addition of nickel alloy of Inconel type deposited in a groove (4) formed between the plating (34) and the separate piece (35).

5 Claims, 5 Drawing Figures

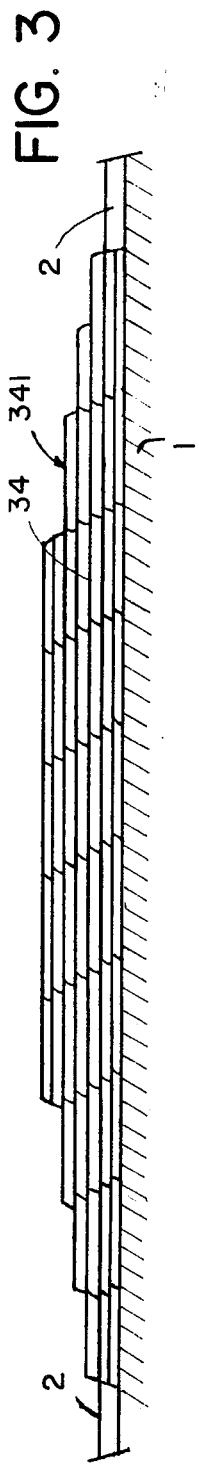
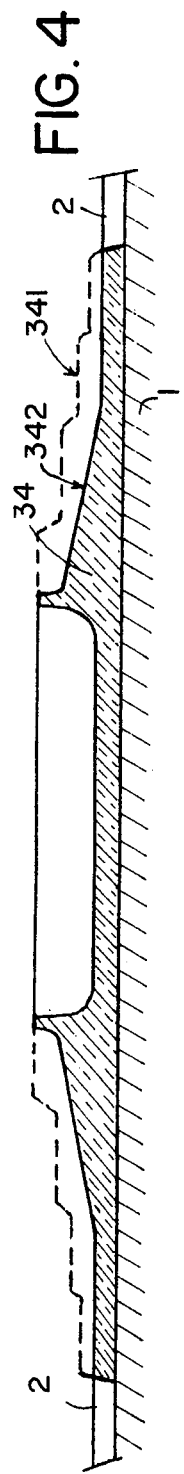
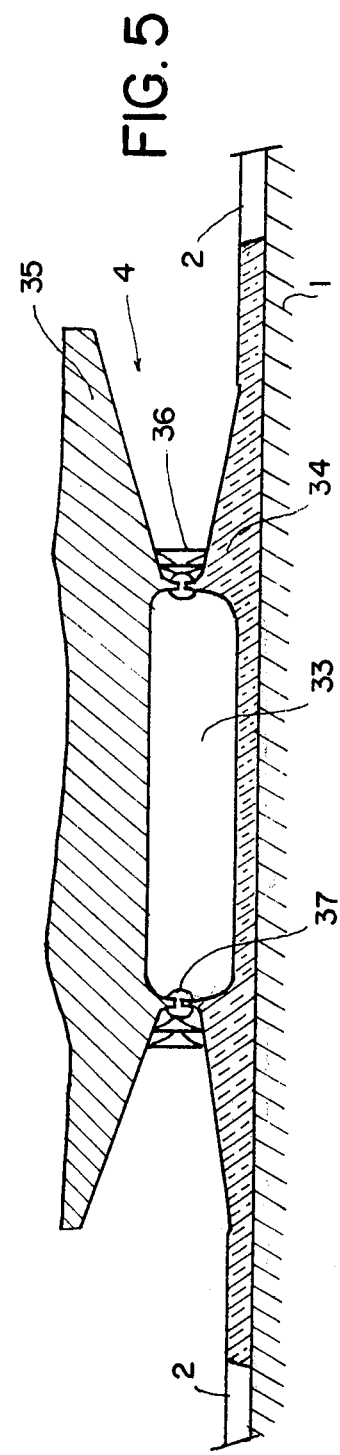

METHOD OF MANUFACTURE OF A HOOP FOR THE VESSEL OF A NUCLEAR REACTOR

The present invention relates to the method of manufacture of a hoop for the vessel of a nuclear reactor, equipped internally with projecting guide blocks serving for the guidance of the internal equipment.

A nuclear reactor vessel enclosing the core consists of forged cylindrical hoops of low-alloy steel. These hoops are welded together, the bottom end of the vessel consisting of an end welded to one of the hoops. The vessel is entirely clad with stainless steel intended for preventing corrosion by the water in the primary circuit.

The equipment internal to the vessel is guided by guide blocks integral with the bottom hoop of the vessel. These guide blocks which serve for the guidance of the bottom plate of the core, are provided with a vertical groove adjacent to the axis of the hoop, and have an M-shape.

The welding of these blocks by known methods presents disadvantages. In particular, where the welds have full penetration, the picking up again of the roots may turn out to be tricky to effect because of their inaccessibility.

French Pat. No. 2,134,278 discloses a method of welding guide blocks to the inside of a nuclear reactor vessel lined on the inside with a plating. In accordance with this method, there is executed on the inner wall of the vessel, by buttering with stainless steel, a projecting thickened portion to which the block is welded by electron beam without metal addition. The guide block is connected to the thickened portion only at its periphery.

The object of the invention is a method of manufacturing a hoop which is lined with a plating of stainless steel and to which are welded guide blocks of nickel-base alloy. The production of the guide blocks from nickel-base alloy confers improved resistance to corrosion. This method of manufacture enables picking up of the welds to be avoided and minimizes machining and deformation due to welding. It may easily be carried out, the axis of the hoop being horizontal during certain phases.

The method in accordance with the invention consists in coating an outer cylindrical hoop of low-alloy steel internally with a thin plating of stainless steel, and in attaching supporting blocks to the inside of this hoop, leaving bare an area of low-alloy steel of the hoop surrounded by the stainless steel plating, and depositing on this hollowed area by arc welding a plating of nickel-base alloy of Inconel type until a profile is obtained which projects with respect to the plating of stainless steel, and then to machining this plating and arc welding thereto a separate piece of nickel-base alloy of Inconel type with addition of nickel alloy of Inconel type desposited in a groove formed between the plating and the separate piece.

In accordance with one characteristic of the method, the plating of nickel-base alloy is deposited by successive layers of ribbon deposited under electrically conductive flux.

The hoop obtained by this method is equipped internally with projecting guide blocks and consists of an outer cylindrical hoop of low-alloy steel lined internally with a thin plating of steel. Each block is of nickel-base alloy of Inconel type and is directly welded to the inner cylindrical surface of low-alloy steel and is connected to the thin plating of stainless steel.

The invention will now be described in greater detail by referring to the attached drawings.

FIG. 3 is a section of the plating of nickel-base alloy welded directly onto the wall of the low-alloy steel hoop.

FIG. 4 is a view of this plating after machining.

FIG. 5 represents the machined plating and the separate piece of nickel-base alloy forming the guide block.

Figure 1:
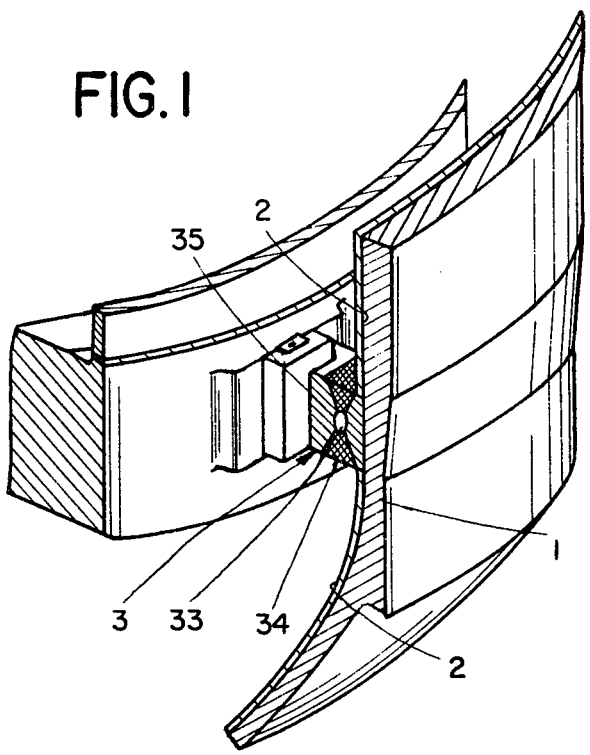
FIG. 1 represents the hoop to which is welded a guide block.
Figure 2:
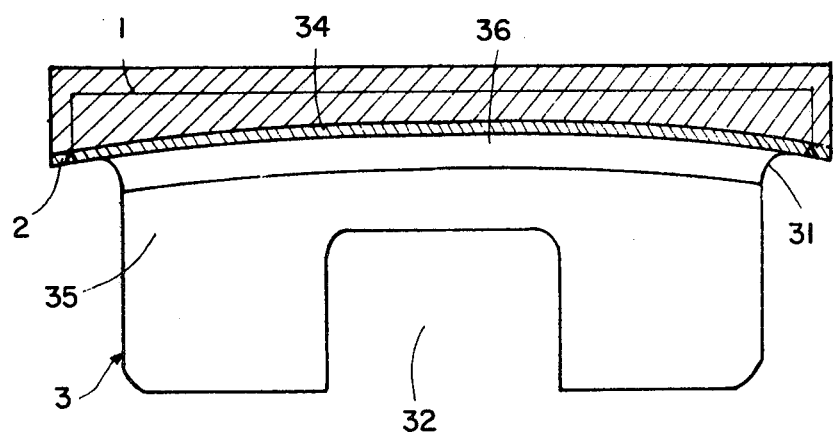
FIG. 2 is a detail in section from FIG. 1, showing the guide block welded to the hoop.

Referring to FIGS. 1 and 2, the hoop in accordance with the invention consists of an outer cylindrical hoop 1 obtained by forging. This hoop is of low-alloy steel and is lined internally with a thin plating 2 of stainless steel. This stainless steel plating is obtained in a manner known per se.

The guide block 3 is of nickel-base alloy of Inconel type containing more than 67% of nickel. The composition by weight of this alloy is: $C \leq 0.10\%$; $S \leq 0.015\%$; $P \leq 0.030\%$; $Si \leq 0.25\%$; Mn: 2.5 to 3.5%; $Ni \leq 67\%$; Cr: 18 to 22%; $Cu \leq 0.5\%$; $Co \leq 0.10\%$; $Nb + Ta = 2.3$ to 3%; $Ti \leq 0.75\%$; $Fe \leq 3.0\%$. This block is directly welded onto the inner cylindrical surface of low-alloy steel of the hoop and is directly connected by a connection 31 to the thin plating 2. The block consists firstly of a plating 34 of nickel-base alloy and secondly of a separate piece 35, likewise of nickel-base alloy, these two portions being welded together by a weld bead 36 of nickel-base alloy surrounding the chamber 33. This guide block 3 has towards the exterior a groove 32 formed by plane and/or cylindrical surfaces parallel with the axis of the hoop, and is generally M-shaped. The separate portion is provided adjacent the plating with a basin-shaped hollow of perimeter equal to a basin-shaped hollow provided in the plating 34. The two hollows form a chamber 33 into which opens the ring 37 between the two portions 34 and 35.

The hoop 1 is first lined with the inner plating 2 of stainless steel by welding. At the location of each guide block 3 known as an "M" block, an area of low-alloy steel surrounded by the stainless steel plating is left bare. The dimensions of the window are adapted to the dimensions of the "M" block.

The plating of nickel-base alloy is deposited in the hollow window by arc in contact with the bare surface of low-alloy steel under electrically conductive flux. This plating of alloy of Inconel type is deposited by successive layers of ribbon until a projecting profile is obtained, referenced 341 in FIG. 3. The base layer in contact with the low-alloy steel is deposited hot (at a temperature of the order of 180° C.). The upper layers are deposited cold.

As a variant, the plating 34 might be effected by buttering by welding with a coated electrode. In this manual method the coated electrode has a core of nickel-base alloy of Inconel type and an outer coating which plays a metallurgical and technical part in protecting the deposit. A synthetic electrode having a nickel core may also be used.

After carrying out the plating, a stress-relieving operation is effected.

The plating 34 is then machined so as to go from the rough profile 341 to the machined profile 342 (FIG. 4). This profiled plating 342 forms a central hollow surrounded by a sloping surface which connects with the plating 2. A projecting annular collar edges the periphery of the central hollow.

By TIG arc a fusible ring 37 is tacked onto the collar of the plating 34. This ring is of nickel-base alloy of Inconel type. The TIG method employs a torch equipped with a tungsten electrode around which gas protection assures the non-oxidation of the bath.

The separate piece 35 to be welded to the plating 34 is if nickel-base alloy of Inconel type. This piece has a hollow matched to the hollow in the plating and edged by a collar of the same perimeter as the collar of the plating 34.

The separate piece 35 is positioned above the profiled plating 34, the collars arranged face to face and forming the plane of join being separated by the fusible ring 37. The piece 35 and the plating 34 are separated round the collars by an annular groove 4 the cross-section of which has a general U-shape and the width of which (measured perpendicular to the axis of the hoop) increases from the collars edging the chamber 33.

By means of the TIG method, the root pass 36 is then executed in the bottom of the annular groove 4. This welding causes melting of the ring 37 of nickel-base alloy, which is interposed in the plane of join between the collars. This ring 37 then forms a ridge in the chamber 33. During this phase, the axis of the hoop is horizontal. The weight of the piece 35 crushes the ring 37. The groove 4 is then partially filled by a supporting layer of nickel-base alloy of Inconel type by a manual arc method with coated electrodes.

The hoop is then tilted so that its axis of revolution is vertical. The groove 4 is filled outside the supporting layer with nickel-alloy of Inconel type, deposited in several layers by a manual arc method with coated electrodes. This welding operation necessitates inverting the hoop.

The weld bead 36 is machined or ground along the whole circumference so as to obtain the connection 31.

I claim:
1. A method of manufacturing a hoop for a nuclear reactor vessel, equipped internally with projecting guide blocks of nickel-base alloy, formed of an outer cylindrical hoop (1) of low-alloy steel coated internally with a thin plating (2) of stainless steel, comprising the steps of
    (a) internally coating said hoop (1) with a thin stainless steel plating (2);
    (b) attaching supporting blocks (3) to the interior of said hoop (1), leaving bare an area of low-alloy steel of said hoop surrounded by said stainless steel plating (2);
    (c) depositing on said area by arc welding a plating (34) of nickel-base alloy until a profile is obtained which projects with respect to said stainless steel plating (2);
    (d) machining said nickel-based alloy plating (34) and then welding thereto a separate piece (35) of nickel-base alloy by arc welding with addition of nickel alloy deposited in a groove (4) formed between said nickel-base alloy plating (34) and said separate piece (35).
2. A method according to claim 1, wherein said nickel-alloy base is deposited in successive layers of ribbon under electrically conductive flux.
3. A method according to claim 1 or 2, comprising the step of interposing a fusible ring (37) of nickel alloy in the plane of join between said nickel alloy plating (34) and said separate piece (35), before depositing a weld bead (36) in the bottom of said groove.
4. A method as claimed in claim 1 or 2, wherein said separate piece is positioned above said plating of nickel-base alloy plating (34) when said hoop is horizontal, a weld bead is deposited in the bottom of said groove, and said hoop is then inverted.
5. A method as claimed in claim 1 or 2, wherein said groove (4) has a U-shaped cross-section.

* * * * *